June 2, 1936. J. D. EDWARDS 2,043,038
ANODE FOR ELECTROLYTIC CONDENSERS
Filed Jan. 26, 1935
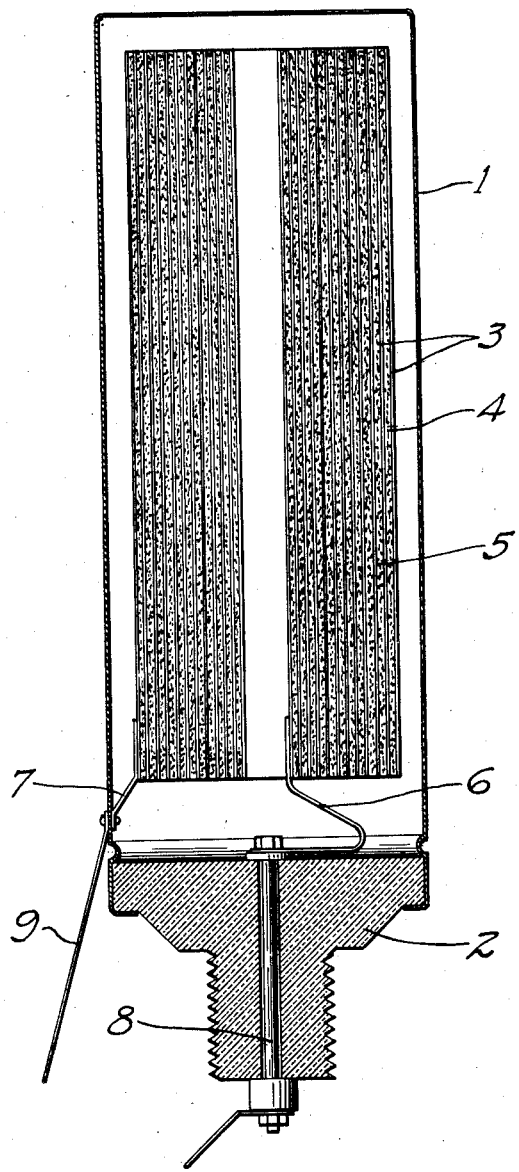
INVENTOR
Junius D. Edwards
BY
ATTORNEY Patented June 2, 1936

2,043,038

UNITED STATES PATENT OFFICE 2,043,038

ANODE FOR ELECTROLYTIC CONDENSERS

Junius David Edwards, Oakmont, Pa.

Application January 26, 1935, Serial No. 3,665

5 Claims. (Cl. 175—315)

This invention relates to improvements in electrolytic devices and particularly to electrolytic condensers of the type employing a film-forming metal as the anode and an electrolyte for the cathode. The invention relates more particularly to improved materials for use as anodes in such condensers.

Electrolytic condensers dependent for their operation upon the valve action of a film-forming metal have come into extensive use in radio and allied arts. Such condensers are usually classified according to whether the electrolyte used is in the form of a liquid or in the form of a paste. Condensers employing a paste-type of electrolyte are usually designated as dry-type condensers, as distinguished from condensers employing a liquid electrolyte. For the purpose of illustration I have shown in the drawing a condenser of the dry type in section.

Referring to the drawing, 1 is a container of suitable material, such as aluminum, closed at one end with an element 2, which may be of hard rubber or some other insulating material and may be provided with a threaded projecting portion as shown, for the purpose of attaching the condenser to a radio panel or the like. Within the container proper is mounted the condenser structure proper which consists of one or more pair of sheets of aluminum foil 3 with an absorbent separator or interposed sheet 4 of gauze, paper, or the like. The absorbent separator, impregnated with a suitable viscous electrolyte, should cover the total area of the two layers of foil to obtain maximum capacity and the best anode-forming characteristics. It is convenient to form this structure in the form of a long strip which is rolled into a substantially cylindrical shape as indicated, with another absorbent separator strip 5 between the successive turns thereof. A terminal strip 6 is attached to the one layer of foil and another terminal strip 7 is attached to the other layer of foil and the container 1 as shown. The foil attached to the terminal strip 6 is the anode foil, which should exhibit the film forming properties mentioned. An electrical connection with the anode foil is provided by the rod 8 extending through the element 2. The other layer of foil merely furnishes an auxiliary conducting path for the electrolyte cathode. A suitable cathode terminal 9 may be provided as shown.

The efficiency and life of condensers are largely dependent on the material used for the anode on which must be formed an extremely thin film of high electrical resistance. The film is formed by electrochemical action by making the foil anode with respect to a suitable electrolyte. The electrolyte may be the electrolyte used in the completed condenser or the film may be formed prior to assembly of the anode foil in the condenser. Various metals and alloys exhibit the required film-forming characteristics to a degree. The selection of the best material for general use is often influenced by considerations other than the efficiency of the anode material alone. The more important of these characteristics are, first cost of material, ease of fabrication of material into a form suitable for an anode, and the length of time during which the material will exhibit the desired characteristics when in use.

Aluminum has been found to be the most suitable material for forming such anodes and most of the electrolytic condensers in use today employ aluminum for the anode. Solely from an electrical viewpoint, aluminum of extremely high purity is ideally suited for use as anode material. In combination with a suitable electrolyte this anode material exhibits good film-forming characteristics and provides a condenser structure which has a good power factor and low leakage. However, aluminum of extremely high purity is expensive.

Aluminum of ordinary commercial purity, while it can be readily formed into shapes suitable for most types of anodes, is deficient from electrical considerations as an anode material and when used in condensers the resulting structure has a high leakage rating and poor power factor. In addition to being a source of power loss, high leakage is seriously detrimental to the life of condensers, particularly in condensers of the dry type. All types of electrolytic condensers are dependent for their life upon the water content of the electrolyte and if the water is entirely removed the condenser will cease to function. It is well known that the higher the leakage the more rapid the water dissipation and that the ratio of leakage to condenser deterioration is practically a direct one. Therefore, any percentage decrease in leakage results in a corresponding increase in the life of the condenser. The importance of low leakage characteristics in any condenser is apparent and particularly in condensers of the dry type where the original water content is very low.

The impurities found in commercially pure aluminum serve to increase the leakage of any condenser in which the material is used as an anode, over that obtained when aluminum of extremely high purity is used. However, I have found that when titanium in small amounts is added to aluminum of commercial purity the leakage characteristics of the metal, when used as an anode in condensers, are greatly improved. The beneficial effects are noticeable even when titanium in amounts equal to only a few hundredths of one per cent by weight is added to aluminum of commercial purity and additions of up to about 0.4 per cent by weight are beneficial and practical. More particularly, I have found that the best results from all considerations are to be obtained when the titanium is added in amounts equal to 0.05 to 0.4 per cent by weight and preferably in amounts equal to about 0.2 per cent by weight of commercially pure aluminum. By commercially pure aluminum I mean aluminum containing a total of from 0.1 to 0.6 per cent by weight of impurities such as copper, iron and silicon.

Anode material formed in accordance with this invention is in all respects favorably comparable with aluminum of extremely high purity with regard to the essential electrical requisites of a condenser anode material. In addition it is more readily worked into a form suitable for anode construction such as foil, sheet and the like, and is much less expensive.

Having thus described my invention and what I believed to be new and desire to secure by Letters Patent, I claim:

1. A film forming anode material for electrical condensers and the like consisting of aluminum of commercial purity to which is added titanium in amounts equal to 0.05 to 0.4 per cent by weight.

2. A film forming anode material for electrical condensers and the like consisting of aluminum containing impurities to which is added titanium in an amount equal to 0.2 per cent by weight.

3. A film forming electrode for an electrolytic condenser or the like consisting of aluminum of commercial purity to which is added titanium in amounts equal to 0.05 to 0.4 per cent by weight.

4. A film forming anode material for electrical condensers and the like consisting of aluminum of commercial purity to which is added titanium in an amount equal to about 0.2 per cent by weight.

5. A film forming electrode for electrolytic condensers or the like consisting of aluminum of commercial purity to which is added titanium in an amount equal to 0.2 per cent by weight.

JUNIUS DAVID EDWARDS.